April 19, 1960

G. V. ZITO 2,932,970

CAPACITANCE BRIDGE OSCILLATOR

Filed April 1, 1955

INVENTOR.
GEORGE V. ZITO
BY Geo. J. Hyde
ATTORNEY 2,932,970

CAPACITANCE BRIDGE OSCILLATOR

George V. Zito, Northvale, N.J., assignor to Bendix Aviation Corporation, Teterboro, N.J., a corporation of Delaware Application April 1, 1955, Serial No. 498,681

3 Claims. (Cl. 73—304)

This invention relates to capacitance bridge oscillator circuits in which the output of an oscillator is applied across a bridge having a variable capacitance in one arm. It is especially suitable for circuits in which the value of a variable factor controlling the variable capacitance is represented by the bridge output, and has been found particularly advantageous in apparatus for measuring the depth of liquid in a container by variations in the capacity of a condenser unit vertically immersed in the liquid. Such systems comprise generally an oscillator circuit whose output is connected through a coupling stage to the input of a bridge circuit, the bridge output passing through another coupling stage to an output circuit. This coupling stage arrangement has been considered necessary for effective operation, since it permits impedance matching and minimizes detrimental factors such as displacement currents.

An object of the invention is to provide a circuit arrangement including oscillator, bridge and output sections that dispenses with the coupling stages while avoiding impedance mismatch as well as material detriment from said factors. This is in general accomplished by connecting the capacitance bridge in the oscillator circuit so that it constitutes as a whole a tuning capacitance, and is thus in effect part of the latter circuit.

With this arrangement the load on the oscillator will be provided by the bridge output circuit; and a further object is to provide an output circuit that will maintain a substantially uniform load.

Another object is to provide an arrangement of the indicated type in which changes in the capacity of the variable capacitance will not materially alter the bridge characteristics that affect oscillator operation, and specifically the current through the bridge in the input circuit, while maintaining the necessary variations in the bridge output proportionate to changes in the variable capacitance. A specific purpose is to produce this result by means of a bridge having an overall input circuit capacitance offset from peak resonance which will maintain substantially uniform current during said capacity changes.

An object is to provide a novel uniform load arrangement for the output circuit of a bridge-energizing oscillator; and a related more specific purpose is to arrange a rectifying device in such circuit so that it substantially constitutes such load.

Another purpose is to simplify the circuits and component parts used in providing a liquid depth responsive system, comprising an oscillator, a bridge with immersed condenser, and an output circuit, usually including an indicator. A related purpose is to provide such a system having parts that may be small and adapted for housing in a small compact unit.

The foregoing and other objects, purposes and advantages of the invention will appear more fully from consideration of the detailed description which follows in conjunction with the accompanying drawing, wherein one embodiment of the invention is illustrated. It is to be expressly understood, however, that the drawing is for the purposes of illustration and description, and is not to be construed as defining the limits of the invention.

Figure 1:
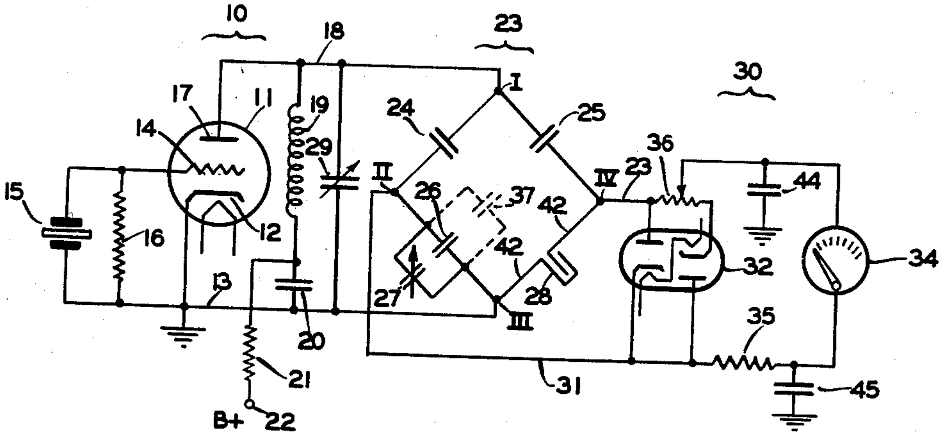
Fig. 1 is a schematic diagram of a circuit embodying the invention.

The oscillator section 10 of the circuit includes a source of alternating current of suitable frequency. A self-contained oscillator unit is advantageously provided, comprising an amplifying element, preferably an electron emission tube or a transistor. The illustrated embodiment includes a tube 11, shown as a triode, having a cathode 12 connected to grounded lead 13, and a control grid 14 connected through piezo-electric crystal 15 to lead 13, said grid and lead being likewise connected through grid biasing resistor 16. Plate 17 is connected through lead 18 to a tank circuit which includes an inductance 19 and blocking condenser 20 connected in series to ground lead 13, inductance 19 being connected through resistor 21 to a source of plate voltage 22.

The bridge section 23 is connected in parallel with inductance 19 and therefore constitues an overall capacitance forming part of the tank circuit. The bridge in the illustrated embodiment includes fixed equal condensers 24 and 25 in two adjacent arms, connected at one side to the input terminal I, which is connected to plate lead 18, and at the other side to output terminals II and IV. A fixed condenser 26 in a third arm is connected between output terminal II and input circuit terminal III, the latter being connected to ground lead 13. A variable trimming condenser 27 is advantageously connected in parallel to condenser 26.

The immersed condenser 28 is connected in the fourth arm between output terminal IV and input circuit terminal III. Condenser 28 comprises spaced plates, the dielectric between which is formed by the liquid to be measured and the gas above the liquid in proportions varying in accordance with changes in the liquid depth, thereby varying the capacity of condenser 28 in accordance with such depth changes. One embodiment of a condenser of this type is shown and described in the application by the same inventor filed on April 6, 1955, Serial No. 499,580, entitled "Liquid Oxygen Depth Indicating System." A variable trimming condenser 29 is connected between leads 13 and 18 in parallel with the bridge 23.

The bridge output circuit from terminals II and IV is preferably connected across an output variation responsive section 30, which, in the form shown, includes an indicator which may be calibrated in depth or liquid volume units. It is important, with the bridge 23 connected as indicated, that the section 30 shall have uniform impedance regardless of variations in the capacity of the depth gauge condenser 28, since section 30 constitutes substantially the load in the plate circuit of tube 11. This is effectively accomplished by connecting bridge output lead 31 from terminal II to a cathode and anode of a dual diode 32, the other output lead 33 from terminal IV being connected to the other anode and cathode of said diode. This provides an arrangement whose impedance does not materially vary with changes in the bridge output, and therefore does not introduce objectionable variation in the load in the oscillator output circuit.

An indicator 34 of the ammeter type, but advantageously calibrated in terms of the depth or volume of the liquid probed by condenser 28, is connected at one side through isolating resistor 35 to lead 31 and at the other side to lead 33, preferably through a potentiometer 36 in said lead between the cathode and anode of said tube to which the latter lead is connected, said potentiometer providing means for balancing the two space paths in the diode 32.

A grounded condenser 44 at one side of indicator 34 provides a radio frequency bypass to ground, and with the portion of potentiometer 36 in series with said indicator, provides a filter network. Grounded condenser 45 at the other side of said indicator provides a similar bypass and filter with resistor 35.

The two sections of tube 32 are conveniently thought of as portions of different circuits. The left half of the tube short circuits one half of the oscillator output wave so that a half wave pulsating voltage is applied to the circuit including potentiometer 36, D.C. meter 34, resistor 35 and capacitors 44 and 45. This pulsating voltage would ordinarily cause a corresponding pulsating current to flow through the meter except for the action of capacitors 44 and 45 which charge rapidly upon a rise in current but discharge slowly through the meter to maintain meter current substantially constant. Thus this is a peak reading voltmeter circuit. The remaining problem is to provide means for applying only a selected portion of the pulsating input voltage to this circuit to adjust the voltage to the meter calibration. This could be done by connecting the potentiometer 36 resistor directly across the left or rectifier half of tube 32. But this would provide a constant and, depending on the setting of the potentiometer tab, low resistance discharge path for capacitors 44 and 45. To prevent this effect, the potentiometer connection is made through a diode tube, here the right half of tube 32. The left half of tube 32 acts as a low impedance, almost a short circuit, across the bridge 23 output terminals during one half cycle of its oscillation. The right half of tube 32 and potentiometer 36 act as a substantially constant impedance across the bridge output terminals during the opposite half cycle of bridge oscillations.

It is noted that the stray capacitance of the wiring and circuit elements will also affect the overall capacity of the bridge 23, and is indicated by the condenser 37 shown dotted in parallel with the bridge condenser 26, since the stray capacitance is primarily between components of the output circuit connected to terminal II, and ground connected to terminal III, and may be compensated by adjusting tickler 27.

Figure 3:
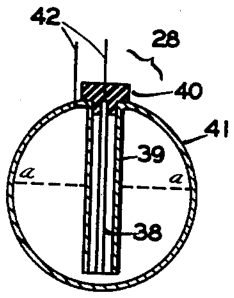
Fig. 3 is a generally diagrammatic central section through a form of condenser immersed in a liquid.

The condenser 28 may be constructed in various ways, condensers of this type being known. A simplified generally diagrammatic embodiment corresponding to the form shown in the above-mentioned application is illustrated in Fig. 3, and comprises a metal rod 38 surrounded by a metal cylinder 39 sufficiently spaced to permit liquid to flow between said rod and cylinder to form part of the dielectric. The rod 38 and cylinder 39, forming the condenser, are mounted on an insulating cap 40, which may be supported on a container 41, and are connected by leads 42 to the bridge terminals III and IV. Condenser 28 may be immersed in the liquid, which in the preferred embodiment is arranged so that the liquid at its maximum height is substantially spaced from the top of the condenser, said height in the embodiment diagrammed in Fig. 3 being indicated at *a—a*.

In the general operation of the circuit, the inductance 19 and bridge section 23 provide the LC resonant circuit required for oscillation of section 10, the resonant frequency being established by crystal 15. With this arrangement there is no coupling stage between the oscillator section and the bridge section, and no problem of matching impedance; and the displacement current factor and others which might interfere with operation can be kept at inconsiderable values. Since bridge section 23 is part of the tank circuit, the output from oscillator tube 11 is in effect connected across rectifier tube 32, which consequently constitutes the load in the oscillator output circuit. Since the connections of tube 32 are balanced, and its impedance is uniform during operation, there will be no variations in load of the type that affect uniformity of oscillator operation in coupled circuits of the usual type.

Figure 2:
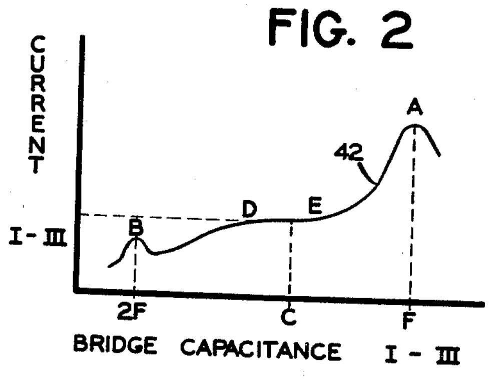
Fig. 2 is a graph of the relationship between bridge input circuit current and bridge capacitance in said embodiment.

The overall capacitance of bridge section 23 is moreover selected to provide substantially uniform impedance, with correspondingly uniform current flow, between input terminals I and III, regardless of the necessary variations in the capacity of condenser 28 and consequently in the overall capacitance of the bridge. The method of accomplishing this result is best understood from Fig. 2, which indicates the changes in current between bridge input terminals I and III for various values of the overall bridge capacitance. When the capacitance F is selected, it tunes the LC tank circuit to exact resonance with the frequency of crystal 15, and the maximum current flows across the bridge as indicated in the graph 42 at point A. When the bridge capacitance 2F is selected, it makes the LC circuit resonant with the second harmonic of said frequency, and a relatively low current peak is produced as indicated at B. As the bridge capacitance is increased from 2F and the current increases as shown by graph 42 the latter passes through an intermediate zone between D and E in which there is only an unimportant change in current for the corresponding change in bridge capacitance. The overall capacitance of the bridge section 23 may be selected, for instance, at a value C, such that the variations in capacity of condenser 28 will maintain the overall capacitance of said bridge between the limits D and E. Consequently the input current across said bridge will not vary materially, regardless of changes in the level of the liquid, and the operation of the oscillator in section 10 will not be affected by such changes.

This result is obtained more readily because the condenser 28 provides only a minor fraction of the overall bridge capacity in the input circuit; in fact, if its capacity under given conditions is the same as that of the condensers in the other bridge arms, it will constitute only a quarter of the bridge capacity. Moreover, since the variation in the capacity of immersed condensers is generally substantially less than their capacitance at complete immersion, and in an established type is generally about 50% of the total, the maximum variation caused by the immersed condenser is only a small proportion, commonly under 25% and, in the preferred embodiment, under 12½%. This makes it readily possible to maintain the overall bridge capacitance variation within the range D–E of Fig. 2.

Although but one embodiment of the invention has been illustrated and described in detail, it is to be expressly understood that the invention is not limited thereto. Various changes can be made in the design, arrangement, and character of the parts without departing from the spirit and scope of the invention as the same will now be understood by those skilled in the art. For instance, while the bridge section 23 has been illustrated as containing only capacitive impedances, and such an arrangement has particular advantages in the system comprising this invention, this showing is not intended to be restrictive and to exclude all other types of impedances. Furthermore, while a balanced rectifier arrangement and an indicator in the bridge output circuit have been shown, it will be apparent that the invention is not limited to this particular type of indicator circuit, or even to the utilization of the variations in the output circuit solely to produce indications, to the exclusion of other arrangements which are responsive to the variations in the output circuit due to changes in the capacitance of condenser 28. Likewise, while the system has been found unexpectedly advantageous when used with an immersed condenser as described, and particularly in a system for determining the amount of a liquefied gas such as oxygen in a container, since such systems benefit greatly from simple and compact arrangements, the invention includes features which are applicable to other types of use.

I claim:

1. An oscillator system, comprising a fixed frequency oscillator and a substantially constant electrical load, said oscillator having an output circuit tuned to a frequency substantially midway between the first and second harmonic of the oscillator frequency, said output circuit including an inductor and a capacitance bridge having its input terminals connected across the inductor and having an arm variable in accordance with a condition, and said electrical load being connected across the output terminals of said bridge.

2. The invention defined in claim 1 in which said electrical load comprises means constituting a low impedance and a relatively fixed impedance across the output terminals of said bridge during successive one half cycles of bridge excitation alternation respectively.

3. An oscillator system responsive to variations in depth of liquid in a container, comprising a fixed frequency oscillator including a tank circuit tuned substantially midway between the first and second harmonic of the oscillator frequency, said tank circuit including an inductance and a capacitive bridge connected in parallel and one leg of the bridge comprising spaced capacitor plates arranged for immersion in a liquid varying in level, the space between said plates being open to the liquid.

References Cited in the file of this patent

UNITED STATES PATENTS

| | | |
|---|---|---|
| 1,694,237 | Simonds | Dec. 4, 1928 |
| 2,290,771 | Shepard | July 21, 1942 |
| 2,375,084 | Coroniti et al. | May 1, 1945 |
| 2,432,669 | Kliever | Dec. 16, 1947 |
| 2,511,562 | Bresee | June 13, 1950 |
| 2,547,780 | Reynst | Apr. 3, 1951 |
| 2,570,218 | Draganjac | Oct. 9, 1951 |
| 2,599,583 | Robinson et al. | June 10, 1952 |
| 2,603,779 | Ferrill | July 15, 1952 |